United States Patent
Syed et al.

(10) Patent No.: US 8,624,559 B2
(45) Date of Patent: Jan. 7, 2014

(54) EXCESSIVE CURRENT DETECTION CONTROLS METHOD

(75) Inventors: Asif A. Syed, Canton, MI (US); Andrew H. Leutheuser, Sunnyvale, CA (US); Jian Lin, Beverly Hills, CA (US); Joseph M. Lograsso, Troy, MI (US); Roland Matthe', Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 470 days.

(21) Appl. No.: 12/904,893

(22) Filed: Oct. 14, 2010

(65) Prior Publication Data

US 2012/0091971 A1 Apr. 19, 2012

(51) Int. Cl.
  *H02J 7/14* (2006.01)
(52) U.S. Cl.
  USPC ............................ 320/162; 320/149; 320/164
(58) Field of Classification Search
  USPC ........... 320/162, 164, 165, 132; 324/428, 434
  See application file for complete search history.

(56) References Cited

U.S. PATENT DOCUMENTS

| | | | |
|---|---|---|---|
| 5,159,218 A * | 10/1992 | Murry et al. ................. | 310/68 B |
| 5,355,305 A * | 10/1994 | Seem et al. ...................... | 700/41 |
| 6,445,980 B1 * | 9/2002 | Vyers ........................... | 700/282 |
| 7,085,611 B2 * | 8/2006 | Yoo et al. ......................... | 700/41 |
| 7,196,493 B2 * | 3/2007 | McGee et al. ................. | 320/104 |
| 7,940,027 B2 * | 5/2011 | Desprez et al. ................ | 320/134 |
| 8,203,314 B2 * | 6/2012 | Odaohhara ..................... | 320/150 |
| 2006/0022642 A1 * | 2/2006 | McGee et al. ................. | 320/132 |
| 2009/0091296 A1 * | 4/2009 | Desprez et al. ................ | 320/134 |
| 2009/0140697 A1 * | 6/2009 | Hurley et al. .................. | 320/139 |
| 2009/0195211 A1 * | 8/2009 | Wang et al. .................... | 320/136 |
| 2009/0195212 A1 * | 8/2009 | Chiasson et al. .............. | 320/136 |
| 2009/0212758 A1 * | 8/2009 | Asinovski et al. ............. | 323/355 |

* cited by examiner

*Primary Examiner* — Drew A Dunn
*Assistant Examiner* — Michael DiBenedetto
(74) *Attorney, Agent, or Firm* — John A. Miller; Miller IP Group, PLC

(57) ABSTRACT

A method for controlling charging and discharging of a battery pack for an electric or hybrid vehicle to prevent overheating damage. Current flowing into or out of the battery pack is monitored, and root mean square (RMS) current is integrated over a time window and compared to a threshold to determine if power needs to be regulated in order to prevent damage to the cells in the battery pack. If the time-integrated RMS current exceeds the threshold, a closed-loop proportional-integral (PI) controller is activated to regulate power input or output. The controller will continue to regulate power until the time-integrated RMS current drops below the threshold. Various thresholds can be defined for different time windows. The gains used in the PI controller can also be adjusted to scale the amount of power regulation.

20 Claims, 5 Drawing Sheets

EXCESSIVE CURRENT DETECTION CONTROLS METHOD

BACKGROUND OF THE INVENTION

1. Field of the Invention

This invention relates generally to a method for controlling power into and out of a battery pack and, more particularly, to a method for controlling charging power into and discharging power out of a battery pack for an electric or hybrid vehicle, which monitors root mean square current integrated over time and regulates power if a current threshold is exceeded.

2. Discussion of the Related Art

Electric vehicles and gasoline/electric hybrid vehicles are rapidly gaining popularity in today's automotive marketplace. Electric and hybrid vehicles offer several desirable features, such as reduced emissions, reduced usage of petroleum-based fuels, and potentially lower operating costs. A key component of both electric and hybrid vehicles is the battery pack. Battery packs in these vehicles typically consist of numerous interconnected cells, which can deliver a lot of power on demand. The battery pack also represents a substantial portion of the vehicle's cost. In order to maximize vehicle driving range and maximize battery pack life, the current to and from the battery pack must be controlled so that the battery pack does not charge or discharge too quickly, which can lead to overheating damage and other problems.

Various methods of monitoring battery packs to prevent overheating have been developed and implemented. These methods include monitoring temperature in the battery pack to detect an over-temperature condition, and monitoring state of charge of the battery pack to determine if the battery pack is being charged or discharged too quickly. However, these methods both have disadvantages. Temperature in a battery pack can only economically be monitored at a few discrete locations within the battery pack; therefore, there may be places in the battery pack which are hotter than the temperature sensors indicate, in which case it is possible that some cells in the battery pack are already damaged by the time a high temperature is detected. Also, there is a time lag involved in the heating of the battery pack, which creates a risk that power-regulating action will only be taken after some damage is already done. State of charge monitoring is typically done for every cell in the battery pack, but state of charge measurement can have a cumulative error, which makes it difficult to accurately determine whether some battery pack cells are about to experience damage. State of charge, like temperature, is also an after-the-fact indicator.

In order to more effectively protect battery packs from damage, a closed-loop, predictive monitoring and control method is needed. A method which monitors charging and discharging current over a certain time window can be used to proactively determine if power needs to be regulated in order to prevent damage to battery pack cells, thus overcoming the limitations of existing methods. Such a method can also be implemented in a way that improves the drivability of the vehicle, while still preserving the durability of the battery pack.

SUMMARY OF THE INVENTION

In accordance with the teachings of the present invention, a method for controlling charging and discharging of a battery pack for an electric or hybrid vehicle is disclosed. Current flowing into or out of the battery pack is monitored, and root mean square (RMS) current is integrated over a time window and compared to a threshold to determine if power needs to be regulated in order to prevent damage to the cells in the battery pack. If the time-integrated RMS current exceeds the threshold, a closed-loop proportional-integral (PI) controller is activated to regulate power input or output. The controller will continue to regulate power until the time-integrated RMS current drops below the threshold. Various thresholds can be defined for different time windows. The gains used in the PI controller can also be adjusted to scale the amount of power regulation.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a current monitoring and control method for battery packs is merely exemplary in nature, and is in no way intended to limit the invention or its applications or uses. For example, the disclosed method is described in terms of its application to electric or hybrid vehicle battery packs, but the method may be equally applicable to battery packs in utility vehicles, such as forklifts and golf carts, and non-vehicle-based battery packs.

Battery packs in electric and hybrid vehicles are typically large enough that thermal management of them is a concern. Unlike small batteries used in computers and electronic devices, electric and hybrid vehicle battery packs consist of many cells tightly packed together, which means that each cell does not have sufficient exposed surface area to allow effective air cooling. The thermal management problem is compounded by the high currents needed to drive an electric or hybrid vehicle, as heat is released during charging and discharging. High operating temperatures are known to be detrimental to battery packs, such as lithium ion battery packs of the type used in many electric and hybrid vehicles.

It is therefore imperative that the cells in a battery pack are protected from overheating during charging or discharging operations. Electric vehicle battery packs normally have an integral cooling system to remove heat from the battery pack as necessary to maintain temperature below a certain threshold. Battery pack control systems have also been developed which limit the amount of charging or discharging current based on either temperature or state of charge considerations. These existing control methods and systems may not always fully protect the battery pack from damage, because they are designed to react to a temperature or state of charge measurement which may include error and/or time lag. To overcome these problems, a new type of battery pack control method is disclosed herein, which uses a time-history of charging or discharging current as a basis for power regulation.

Figure 1:
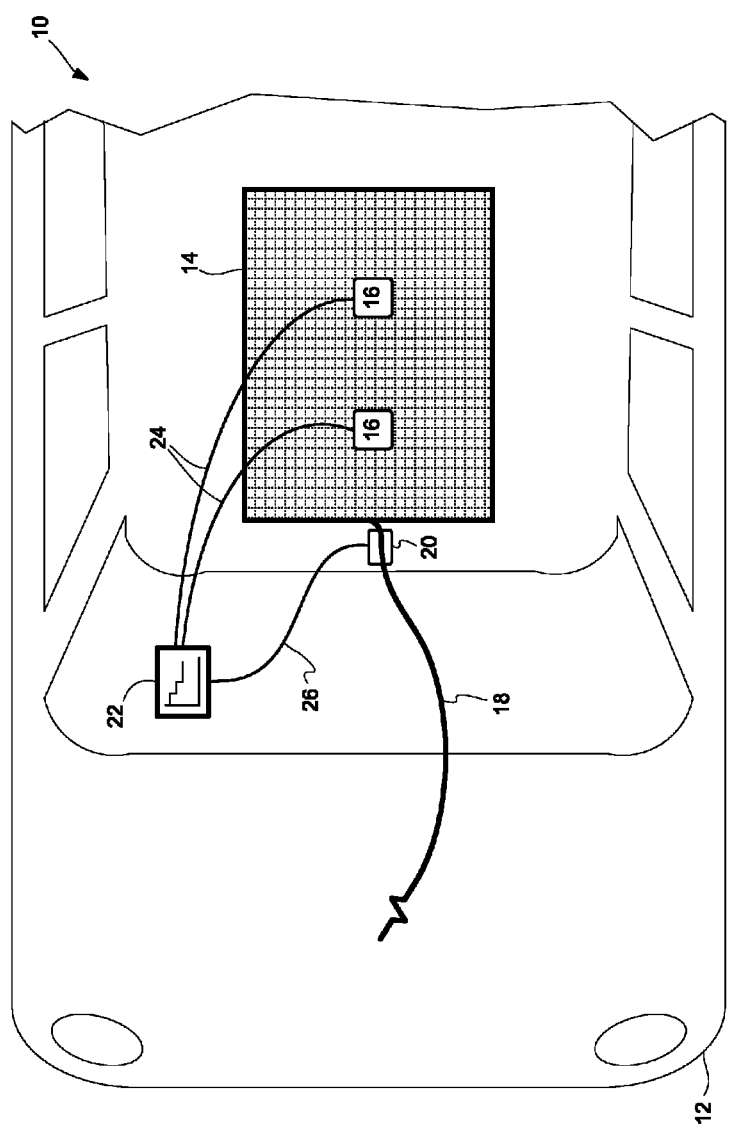
FIG. 1 is a schematic diagram of an electric vehicle battery pack power management system.

FIG. 1 is a schematic diagram of an electric vehicle battery pack power management system 10. A vehicle 12 uses one or more electric motors (not shown) for propulsion, with electrical energy for the motors provided by a battery pack 14. The battery pack 14 is fitted with a plurality of voltage and temperature sensors 16, which monitor voltage (as an indicator of state of charge) and temperature in the battery pack 14. Other parameters may also be monitored by the voltage and temperature sensors 16, and measurements may be taken at multiple locations throughout the battery pack 14. A power cable 18 carries all charging and discharging current into and out of the battery pack 14. Charging current comes from a charging transformer (not shown), while discharging current goes to the electric motors. A current sensor 20 continuously measures the charging or discharging current.

A controller 22 is used to monitor and control the current into and out of the battery pack 14, based on measurements from the current sensor 20. The controller 22 is in communication with the voltage and temperature sensors 16 via connections 24, and with the current sensor 20 via a connection 26. The connections 24 and 26 may be wired or wireless. The controller 22 is configured to limit the charging or discharging power if necessary in order to prevent overheating damage to the battery pack 14, as will be discussed in detail below.

The present invention proposes monitoring the actual current into (charging) or out of (discharging) the battery pack 14, and using time-integrated root mean square (RMS) current as a basis for a control algorithm. The algorithm tracks the RMS current over various time intervals, and compares the RMS current against thresholds for the time intervals. If the RMS current exceeds a threshold, a closed-loop proportional-integral (PI) control algorithm, implemented in the controller 22, regulates power. The PI control algorithm in the controller 22 continues to regulate power until the RMS current drops below the threshold value.

Figure 2:
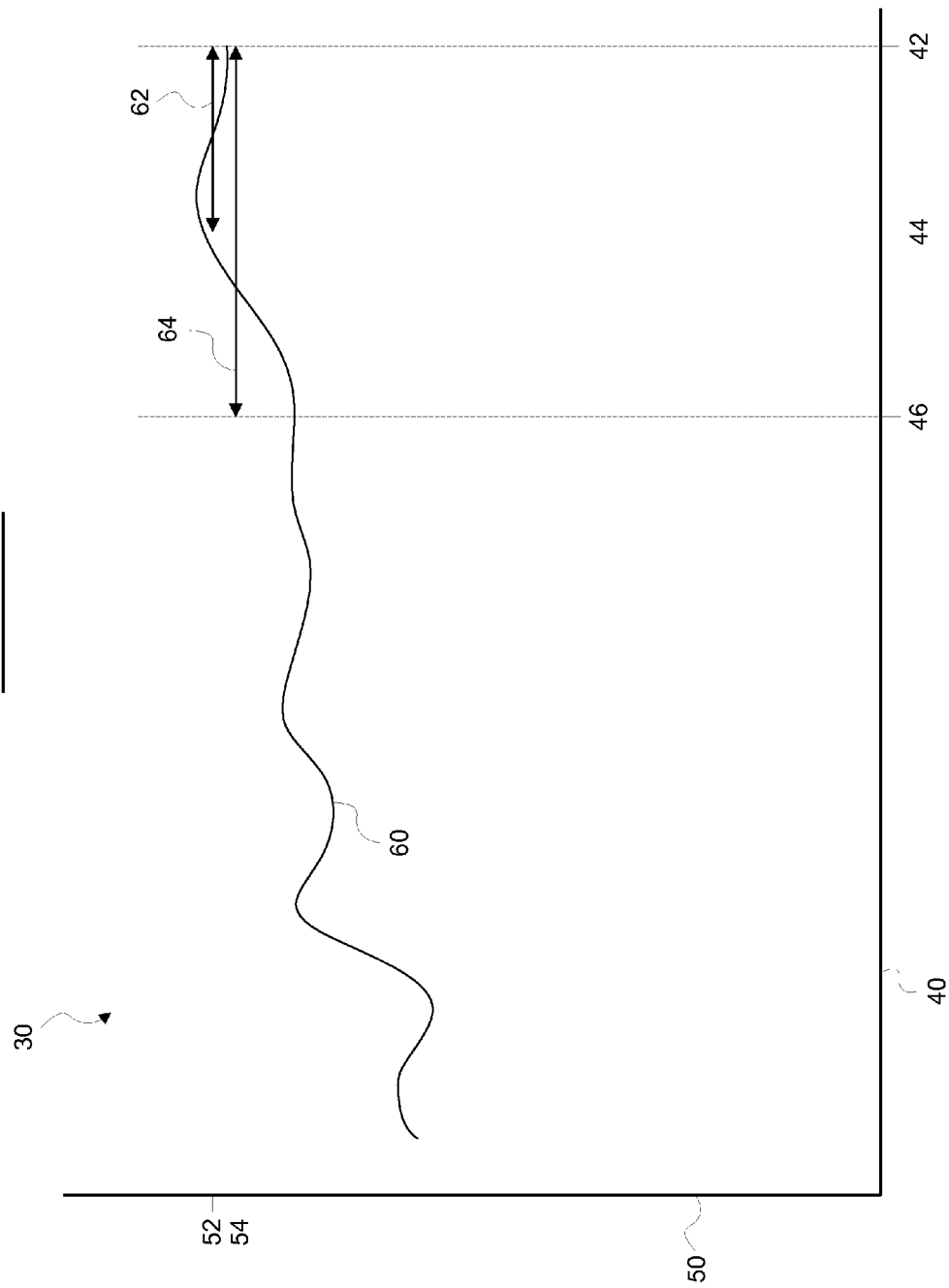
FIG. 2 is a graph of battery pack current versus time, showing how a rolling average RMS current is calculated.

FIG. 2 is a graph 30 showing how rolling average RMS current is calculated for various time windows. In the graph 30, horizontal axis 40 represents time, and vertical axis 50 represents the square of current flowing into or out of the battery pack 14. Curve 60 is a plot of current-squared as a function of time, for a typical operation of the battery pack 14 in the vehicle 12. In order to prevent excessive charging or discharging current in the battery pack 14, it is necessary to monitor RMS current for various time windows, where the time windows look backwards in time from the present time. For example, let hash mark 42 represent the present time, hash mark 44 represent a time 30 seconds prior to hash mark 42, and hash mark 46 represent a time 60 seconds prior to hash mark 42. Then line 62 represents the mean-square current for the past 30 seconds, and line 64 represents the mean-square current for the past 60 seconds. As can be seen on the graph 30, the line 62, which is the 30-second rolling average RMS current and can be designated as $I_{30}^2$, has a current-squared value shown by hash mark 52. Similarly, the line 64, which is the 60-second rolling average RMS current and can be designated as $I_{60}^2$, has a current-squared value shown by hash mark 54. RMS current for any time window can be found by taking the square root of the mean-square current for that time window. Rolling average RMS current can be calculated for any time windows which are considered relevant; for example, the time windows might include the past 30 seconds, the past 60 seconds, the past 2 minutes, and the past 5 minutes.

Figure 3:
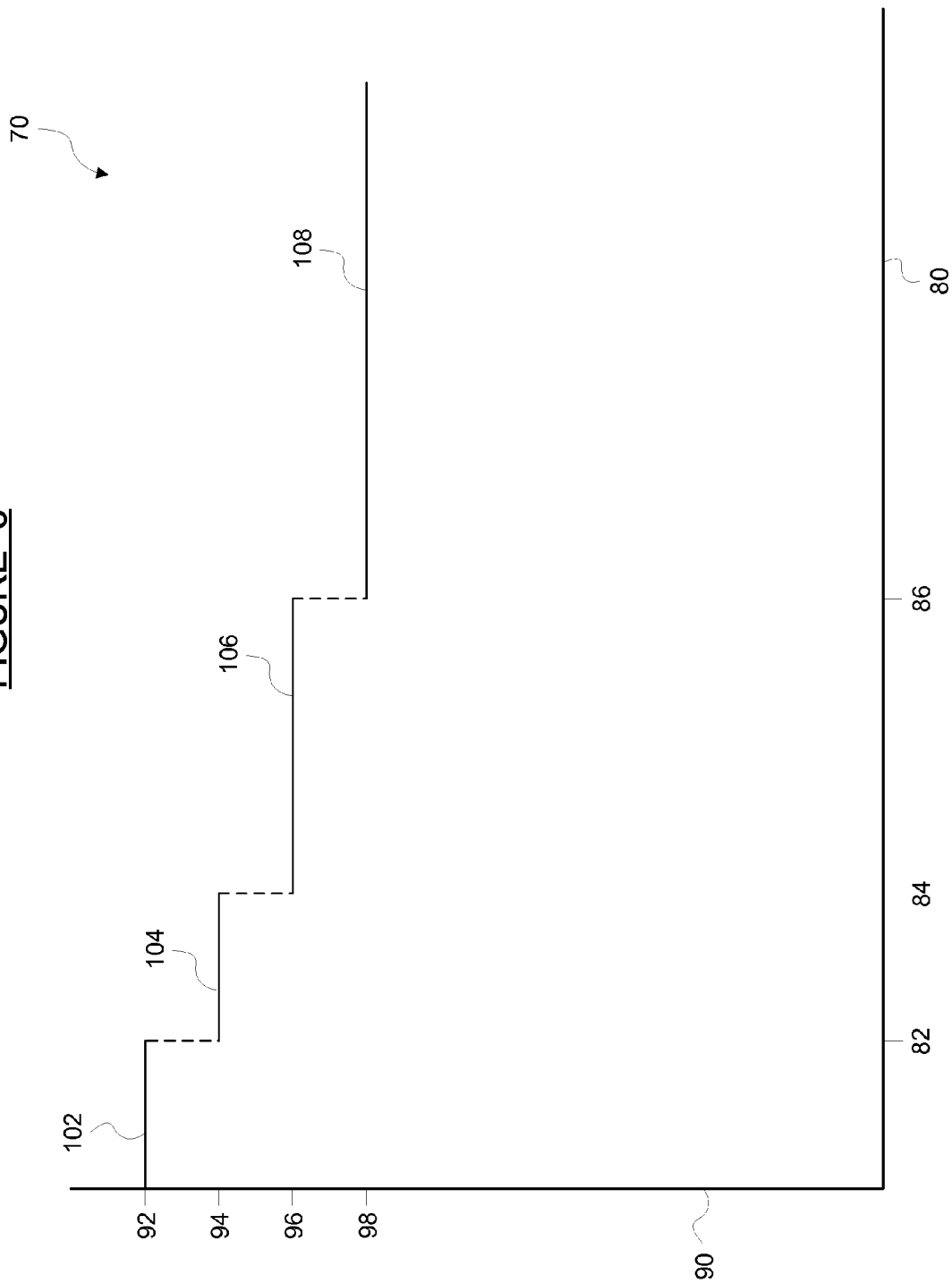
FIG. 3 is a graph of RMS current thresholds as a function of duration time.

With the method defined above for calculating rolling average RMS current for various time windows, it is necessary to define one or more thresholds to be used by the controller 22 in order to determine whether a power limitation must be applied at any point in time. While a single threshold value for RMS current would be simplest to implement, both vehicle performance and battery pack life can be better optimized by using a multiple-threshold model. FIG. 3 is a graph 70 showing how multiple RMS current thresholds can be defined. Time is plotted along horizontal axis 80 of the graph 70, while RMS current is plotted along vertical axis 90. Threshold lines 102, 104, 106, and 108 represent RMS current threshold values which can be used in conjunction with the rolling average RMS currents defined above and shown on the graph 30. In the example shown on the graph 70, hash mark 82 is at a time of 30 seconds. Therefore, the threshold line 102 represents the threshold for the 30-second rolling average RMS current, $I_{30}^2$, as defined above, having an RMS current threshold value designated by hash mark 92. Hash mark 84 is at a time of 60 seconds, so the threshold line 104 represents the threshold for the 60 second rolling average RMS current, $I_{60}^2$, having an RMS current threshold value designated by hash mark 94.

The logic behind the multiple-threshold model is that the battery pack 14 can handle a high charging or discharging power for a short period of time without sustaining damage, but power must be reduced somewhat if continued for an extended period of time. If only a single threshold were used, and the threshold was defined by the threshold line 102, then the battery pack 14 could sustain damage if the threshold current was allowed to continue for several minutes. On the other hand, if only a single threshold were used, and the threshold was defined by the threshold line 108, then short term vehicle performance would be unnecessarily penalized by not allowing a higher current draw for a short period of time. The multiple-threshold model allows both battery pack durability and vehicle performance to be optimized.

In a similar fashion, the threshold lines 106 and 108 are defined, each one being associated with a longer rolling average time window and having a successively lower threshold current value. In the example of the graph 70, the threshold line 106 extends out to hash mark 86 at a time of 2 minutes, and has a threshold current value designated by hash mark 96. And the threshold line 108 is shown as a continuous-duty threshold with no time limit, and has a threshold current value designated by hash mark 98. More or fewer thresholds could be defined than the four shown on the graph 70.

FIGS. 2 and 3 as described above illustrate the concept of rolling average RMS current values, and the associated threshold current values. A detailed discussion of the calculation of the rolling average RMS currents, and the control algorithms used to limit power when necessary, follows.

To obtain the mean-square current for a certain time window, the following theoretical formulation can be defined:

$$I^2 = \frac{1}{t_2 - t_1} \int_{t_1}^{t_2} (I(t)^2) \, dt \qquad (1)$$

Where I is current, t is time, and $t_1$ and $t_2$ are the beginning and ending times of the time window.

From Equation (1), RMS current can be defined as:

$$I_{rms} = \sqrt{\frac{\int_{t_1}^{t_2}(I(t)^2)dt}{t_2 - t_1}} \quad (2)$$

In order to implement the control algorithm in an electronic processor, such as the controller 22, a discrete method for calculating rolling average RMS current is needed. The mean square of the current at a time step can be calculated as:

$$\overline{I_k^2} = \frac{1}{n}\sum_{i=k-n+1}^{k} I_i^2 \quad (3)$$

Where k is the current time step, n is the number of samples, i is the incremental step number, and I is current.

The rolling average of mean square current over the samples n can be calculated using an exponentially weighted moving average filter, with calibrated weights which represent the definite integral, as follows:

$$\overline{I_k}^2 = w\overline{I_{k-1}}^2 + (1-w)I_k^2 \quad (4)$$

Where $$w = \frac{n}{n+1},$$

which implies that $$(1-w) = \left(\frac{1}{n+1}\right).$$

Figure 4:
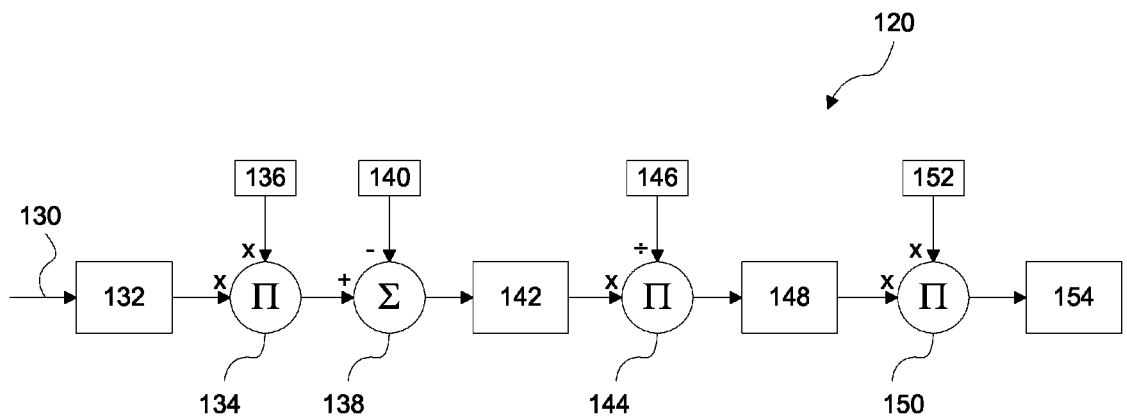
FIG. 4 is a block diagram of a system error calculation module which can be used to calculate an "error" power amount to be used in a proportional integral (PI) control module.

FIG. 4 is a block diagram of a system error calculation module 120 which can be used to calculate an "error" power amount to be used in a PI control module. On line 130, current-squared data is input from the current sensor 20. The current-squared signal on the line 130 is of the type represented by the curve 60 on the graph 30. At box 132, the exponentially weighted moving average filter is applied, as described in Equations (3) and (4), to produce the rolling average mean square current for any desired time window. The rolling average mean square current is provided to product function 134, where it is multiplied by time, from box 136, to produce an I²t value. The I²t value is provided to summing junction 138 where the appropriate threshold for the time window, from box 140, is subtracted. This results in a function u at box 142 which represents the "error", or the amount in excess of the threshold, expressed as current-squared-time. The function u is provided to product function 144, where it is divided by time from box 146, resulting in an Ī² error value. At box 148, the square root is taken, which results in an Ī error value. At product function 150, the Ī error value is multiplied by the output voltage of the battery pack 14, from box 152, resulting in system "error" as a function of time at box 154, expressed as a power in watts. The error value at the box 154 may be converted to kilowatts by dividing by 1000. A sign convention is defined such that the system error function, e(t), is negative if a threshold is exceeded during battery pack charging, and e(t) is positive if a threshold is exceeded during discharging (vehicle driving).

Figure 5:
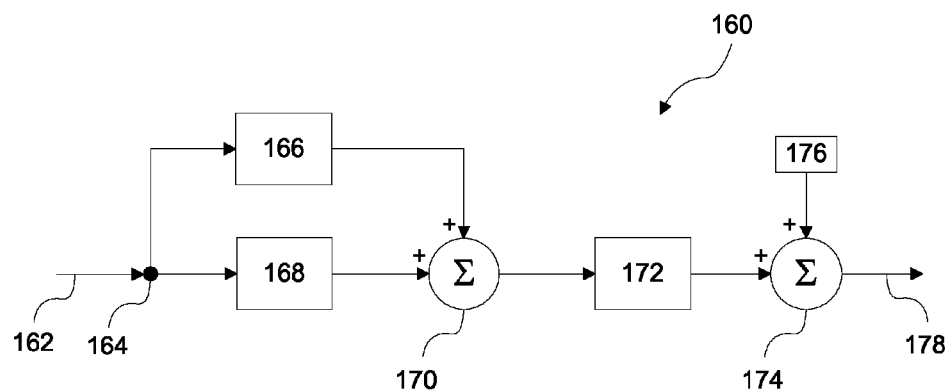
FIG. 5 is a block diagram of the PI control module as would be implemented in the controller of FIG. 1.

FIG. 5 is a block diagram of a proportional integral (PI) control module 160 as would be implemented in the controller 22. The error function e(t) from the module 120 is provided as input on line 162, which splits at junction 164 to a proportional block 166 and an integral block 168. The proportional block 166 computes a control term which is proportional to the error function, that is, the proportional term at the box 166 is equal to a gain constant $K_p$ multiplied by the error function e(t). The integral block 168 computes a control term which is a function of the integral of the error signal, that is, the integral term at the box 168 is equal to a gain constant $K_i$ multiplied by the time integral of the error function e(t). The outputs of the proportional block 166 and the integral block 168 are added at summing junction 170 to produce an overall PI control signal.

At box 172, a clipping function is applied to the integral term from the box 168. The clipping function at the box 172 serves to clip the integral term so that it falls between a maximum value and a minimum value, where the maximum and minimum values depend on whether the battery pack 14 is being charged or discharged. In charging mode, the maximum value for the integral term is equal to the negative of the proportional term, while the minimum value is equal to the negative of a charging power limit, $P_{chlim}$, minus the proportional term. In discharging mode, the maximum value for the integral term is equal to the negative of a discharging power limit, $P_{dchlim}$, minus the proportional term, while the minimum value is equal to the negative of the proportional term. The proportional term from the box 166 is not affected by the clipping function at the box 172. The output of the clipping function at the box 172 goes to summing junction 174, where it is added to either the charging power limit, $P_{chlim}$, or the discharging power limit, $P_{dchlim}$, from box 176. The output of the PI control module 160 is the power setting for the current iteration of the process, on line 178. The power setting on the line 178 is equal to either the charging or discharging power limit, plus the sum of the proportional term from the box 166 and the integral term from the box 168, where the integral term may have been clipped at the box 172. The sign convention is such that the proportional and integral control terms, which are computed from the "error" signal, have a reducing effect on the power setting; that is, in charging mode, when power is a positive value, the proportional control term and the integral control term are negative, thus reducing the power setting; and vice versa for discharging mode. The nature of the clipping function is such that the output power setting will have a value somewhere between zero and the appropriate power limit ($P_{chlim}$ or $P_{dchlim}$).

Figure 6:
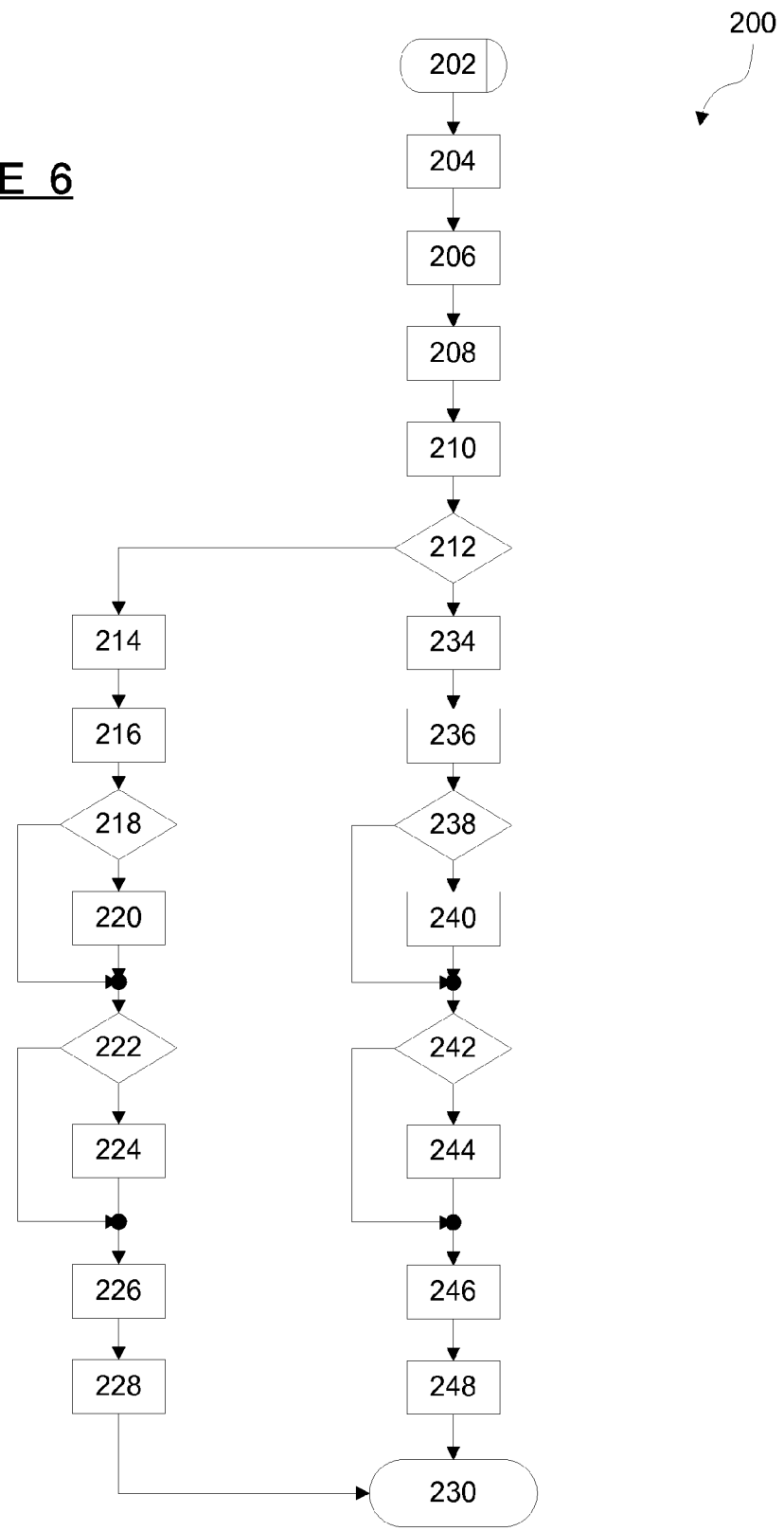
FIG. 6 is a flow chart diagram of a process used by the controller of FIG. 1 to monitor and regulate charging and discharging power in the battery pack.

FIG. 6 is a flow chart diagram 200 of an overall process used by the controller 22 to monitor current and regulate charging and discharging power in the battery pack 14. The flow chart diagram 200 describes the processes used in the system error calculation module 120 and the PI control module 160. The process begins at start oval 202. At box 204, the rolling average mean square current is calculated, per the box 132 of the module 120. At box 206, the mean square current is multiplied by time, to obtain the I²t value, per the product function 134. At box 208, the error function u is obtained by subtracting the I²t value from the appropriate threshold, per the summing junction 138. Also at the box 208, the sign of the error function u is determined. The sign convention is defined such that charging power is positive and system error during charging is negative, while discharging power is negative and system error during discharging is positive. At box 210, the system error function, e(t), is calculated by dividing the error function u by time, taking the square root, multiplying by system voltage, and applying the appropriate positive or negative sign from the box 208. The calculations of the box 210 represent the product function 140, the box 142, the product function 144, and the box 146 of the module 120.

At decision diamond 212, the process branches, depending on the sign of the system error function, e(t). If the error function is negative, the process proceeds to the charging branch at box 214. At the box 214, the proportional term of the PI control module 160 is calculated, per the box 166. At box 216, the integral term of the PI control module 160 is calculated, per the box 168. Decision diamonds 218 and 222 serve to clip the integral term, that is, to keep it between certain extremes, as discussed above. At the decision diamond 218, the integral term from the box 216 is checked to determine if it is greater than the value of the proportional term from the box 214; if so, the integral term is set equal to the proportional term; if not, then the integral term is left unchanged and the process proceeds to the decision diamond 222. At the decision diamond 222, the integral term from the box 216 is checked to determine if it is less than a minimum value for charging mode, where the minimum value is defined as the constant charging power limit, $P_{chlim}$, minus the proportional term from the box 214; if so, the integral term is set equal to the minimum value for charging mode; if not, then the integral term is left unchanged and the process proceeds to box 226. At the box 226, the overall PI control signal for charging is calculated by adding the proportional term from the box 214 to the integral term, where the integral term comes from the box 216 and may be modified (clipped) at the box 220 or the box 224. At box 228, the value for charging power is calculated by adding the overall PI control signal from the box 226 to the charging power limit, $P_{chlim}$. The charging branch of the process ends at terminus oval 230.

At the decision diamond 212, if the error function is positive, the process proceeds to the discharging branch at box 234. At the box 234, the proportional term of the PI control module 160 is calculated, per the box 166. At box 236, the integral term of the PI control module 160 is calculated, per the box 168. Decision diamonds 238 and 242 serve to clip the integral term, that is, to keep it between certain extremes. At the decision diamond 238, the integral term from the box 236 is checked to determine if it is less than a maximum value for discharging mode, where the maximum value is defined as the constant (negative) discharging power limit, $P_{dchlim}$, minus the proportional term from the box 234; if so, the integral term is set equal to the maximum value for discharging mode; if not, then the integral term is left unchanged and the process proceeds to the decision diamond 242. At the decision diamond 242, the integral term from the box 236 is checked to determine if it is greater than the negative of the proportional term from the box 234; if so, the integral term is set equal to the negative of the proportional term; if not, then the integral term is left unchanged and the process proceeds to box 246. At the box 246, the overall PI control signal for discharging is calculated by adding the proportional term from the box 234 to the integral term, where the integral term comes from the box 236 and may be modified (clipped) at the box 240 or the box 244. At box 248, the value for discharging power is calculated by subtracting the overall PI control signal from the box 246 from the discharging power limit, $P_{dchlim}$. The discharging branch of the process also ends at the terminus oval 230.

The net effect of the process shown in the flow chart diagram 200 is that when a threshold is first exceeded, the controller 22 begins to ramp down the charging or discharging power, at a rate which is based on the gain constants $K_K$ and $K_i$ in the PI control module 160. If the rolling average RMS current continues to exceed the threshold as more time passes, the power will ramp down further until, in some cases, the charging or discharging power is equal to zero. With little or no current flowing, the rolling average current is destined to drop below the threshold value after a certain amount of time, and the power will be increased. The power can actually begin to ramp back up before the rolling average current drops below the threshold, as this is the nature of the PI control module 160, and can be tailored with the choice of the gain constants $K_p$ and $K_i$ and the power limits $P_{chlim}$ and $P_{dchlim}$.

When the controller 22 is limiting power because a threshold has been exceeded, the actual power limitation could be implemented in a number of ways—including manipulating the voltage differential between the motor or charging transformer and the battery pack 14, reducing current by adding a resistance along the power cable 18, or other methods. The location and mechanization of the actual power limiter can be decided based on cost, reliability, packaging considerations, or other factors. In any case, the control methodology disclosed above, by monitoring actual current over various time windows, provides robust control of battery pack charging and discharging power, thus preventing damage to the battery pack 14, while providing optimal performance for the vehicle's driver.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for controlling charging and discharging power in a battery pack, said method comprising:
    measuring current flowing into or out of the battery pack with a current sensor;
    establishing a threshold value for current for each time window of a plurality of time windows, where the threshold value is lower for longer time windows;
    calculating a root mean square current for each time window of the plurality of time windows from the measured current;
    comparing the root mean square current for each time window of the plurality of time windows to the threshold value for the time window; and
    controlling the charging or discharging power if the root mean square current for any of the plurality of time windows exceeds the threshold value for the time window.

2. The method of claim 1 wherein calculating a root mean square current for a plurality of time windows includes using an exponentially weighted moving average filter.

3. The method of claim 1 wherein controlling the charging or discharging power includes reducing the charging or discharging power if the root mean square current for any of the plurality of time windows exceeds the threshold value for the time window.

4. The method of claim 1 wherein controlling the charging or discharging power includes computing an error function, and using a proportional integral control algorithm to compute a power setting.

5. The method of claim 4 wherein using a proportional integral control algorithm to compute a power setting includes:
    calculating a proportional term based on the error function;
    calculating an integral term based on the error function;
    clipping the integral term if necessary to keep it between a maximum value and a minimum value;

adding the proportional term and the integral term together; and adding a power limit value to the sum of the proportional term and the integral term to obtain the power setting.

6. The method of claim 5 wherein clipping the integral term includes defining the maximum value and the minimum value for charging power to be different than the maximum value and the minimum value for discharging power.

7. The method of claim 5 wherein adding a power limit value includes defining the power limit value for charging power to be different than the power limit value for discharging power.

8. The method of claim 1 wherein the battery pack is a lithium ion battery pack.

9. The method of claim 1 wherein the battery pack is used in an electric vehicle or a hybrid vehicle.

10. A method for controlling charging and discharging power in a lithium-ion battery pack in an electric vehicle, said method comprising:
    measuring current flowing into or out of the battery pack with a current sensor;
    establishing a threshold value for current for each time window of a plurality of time windows, where the threshold value is lower for longer time windows;
    calculating a rolling average root mean square current for each time window of the plurality of time windows from the measured current;
    comparing the rolling average root mean square current for each time window of a plurality of time windows to the threshold value for the time window; and
    controlling the charging or discharging power, where the charging or discharging power is reduced if the rolling average root mean square current for any of the plurality of time windows exceeds the threshold value for the time window.

11. The method of claim 10 wherein calculating a rolling average root mean square current includes using an exponentially weighted moving average filter.

12. The method of claim 10 wherein controlling the charging or discharging power includes computing an error function, and using a proportional integral control algorithm to compute a power setting.

13. The method of claim 12 wherein using a proportional integral control algorithm to compute a power setting includes:
    calculating a proportional term based on the error function;
    calculating an integral term based on the error function;
    clipping the integral term if necessary to keep it between a maximum value and a minimum value;
    adding the proportional term and the integral term together; and
    adding a power limit value to the sum of the proportional term and the integral term to obtain the power setting.

14. The method of claim 13 wherein clipping the integral term includes defining the maximum value and the minimum value for charging power to be different than the maximum value and the minimum value for discharging power.

15. A power management system for a battery pack providing electrical energy to an apparatus, said power management system comprising:
    a current sensor for measuring current flowing into or out of the battery pack;
    a controller for managing charging and discharging power in the battery pack, said controller being responsive to measurement signals from the current sensor and being configured to limit the power to prevent damage to the battery pack if the current, averaged over each time window of a plurality of time windows, exceeds a threshold value for the time window, where the threshold value is lower for longer time windows; and
    means for limiting charging and discharging power in the battery pack in response to signals from the controller.

16. The power management system of claim 15 wherein the controller includes a system error calculation module and a proportional integral control module.

17. The power management system of claim 16 wherein the system error calculation module in the controller is configured to calculate, for each time window of the plurality of time windows, a rolling average root mean square current using an exponentially weighted moving average filter, calculate the difference between the rolling average root mean square current and the threshold value for the time window, and compute a system error function based on the difference.

18. The power management system of claim 16 wherein the proportional integral control module in the controller is configured to calculate a proportional term and an integral term based on the output of the system error calculation module, clip the integral term if necessary to keep it between a maximum value and a minimum value, add the proportional term and the integral term together, and add a power limit value to the sum of the proportional term and the integral term to obtain a power setting.

19. The power management system of claim 18 wherein the maximum value, the minimum value, and the power limit value are all different for charging power than for discharging power.

20. The power management system of claim 15 wherein the battery pack is a lithium-ion battery pack and the apparatus is an electric vehicle.

* * * * *